United States Patent [19]
Nahar

[11] Patent Number: 5,143,164
[45] Date of Patent: Sep. 1, 1992

[54] APPARATUS AND METHOD FOR IMPROVING THE ACCURACY OF WEIGHING AN OBJECT

[75] Inventor: Rathindra Nahar, Cambridge, Ohio
[73] Assignee: NCR Corporation, Dayton, Ohio
[21] Appl. No.: 704,538
[22] Filed: May 23, 1991
[51] Int. Cl.$^5$ .................... G01G 19/52; G01G 19/40; G01G 21/24
[52] U.S. Cl. .................. 177/50; 177/25.15; 177/255
[58] Field of Search ........... 177/50, 25, 15, 253

[56] References Cited

U.S. PATENT DOCUMENTS

| | | |
|---|---|---|
| 3,670,833 | 6/1972 | Tomohiko et al. |
| 4,281,731 | 8/1981 | Sodler et al. |
| 4,325,441 | 4/1982 | Nakatani et al. |
| 4,553,619 | 11/1985 | Fujinaga |
| 4,563,739 | 1/1986 | Gerpheide et al. |
| 4,660,662 | 4/1987 | Katz |
| 4,715,457 | 12/1987 | Amacher et al. |
| 4,848,477 | 7/1989 | Oldendorf et al. ........ 177/50 X |
| 4,881,606 | 11/1989 | Halfon et al. |
| 5,058,691 | 10/1991 | Sela ................ 177/50 |

Primary Examiner—George H. Miller, Jr.
Attorney, Agent, or Firm—Albert L. Sessler, Jr.

[57] ABSTRACT

Apparatus and method for improving the accuracy of weighing an object using a scale, when the object to be weighed may not be positioned completely on the scale, by performing a first weighing operation, slightly moving the scale on which the object is weighed, performing a second weighing operation, comparing the results, and providing an indication to the scale operator if the two results are not the same. The operator can then reposition the object to be weighed so that it is completely located on the scale, and perform a further weighing operation. The movement of the scale between weighings may be in a horizontal or vertical direction, or in a combination of the two.

32 Claims, 8 Drawing Sheets

APPARATUS AND METHOD FOR IMPROVING THE ACCURACY OF WEIGHING AN OBJECT

BACKGROUND OF THE INVENTION

This invention relates to an apparatus and method for improving the accuracy of weighing an object, and more particularly relates to such an apparatus and method in which a scale is positioned so that its weighing surface is located in an aperture in a surface of a structure so that the object being weighed may be improperly placed so that it is not entirely supported on the scale.

In certain environments in which the weighing of objects takes place, such as the weighing of grocery products in connection with retail supermarket check-out operations, a scale is employed in the line of flow of goods past a cashier, or check-out operator. The scale may be included in a check-out counter, so that it is positioned in an aperture in the counter and is substantially flush with the counter. A scanning device, for scanning bar code labels on the goods being checked out, may be combined with the scale.

In such an arrangement, there is the possibility that an article being weighed may be placed so that it extends over the edge of the weighing platform of the scale and is partially supported by the adjacent counter surface, so that the scale will provide an inaccurate weight. Particularly since check-out operations are usually conducted at a rapid speed, in order to minimize the necessary waiting period of customers in line at the check-out station, it is quite possible that the improper positioning of an article on the scale may not be noticed by the operator, thus resulting in the scale providing a weight reading which is inaccurate, being lower than the actual weight.

It would accordingly be advantageous to provide an apparatus and method for improving the accuracy of weighing an object which would inform an operator of the improper positioning of an object on the scale so that the object could be repositioned on the scale in order to obtain the correct weight.

SUMMARY OF THE INVENTION

The present invention provides an apparatus and method for improving the accuracy of weighing an object using a scale, when the object to be weighed may not be positioned completely on the scale, by performing a first weighing operation, slightly moving the scale on which the object is weighed, performing a second weighing operation, comparing the two results, and providing an indication to the operator if the two results are not the same.

In accordance with one embodiment of the invention, a system for obtaining the accurate weight of an object which may not be placed properly on a scale comprises a scale for weighing objects; support means for said scale; motive means for moving said scale relative to said support means; control means for causing a first weighing of an object placed on the scale, causing said motive means to move the scale incrementally, causing a second weighing of said object, comparing the two weighings and generating a signal descriptive of the results of the comparison of the two weighings; and means responsive to said signal for informing an operator to reposition the object on the scale if it is not positioned correctly.

In accordance with a second embodiment of the invention, a merchandise check-out system including a scale mounted substantially flush with a counter for obtaining the accurate weight of an object which may initially be placed with a portion thereof overhanging the edge of the scale comprises a counter having an aperture therein for receiving a scale; a scale located within the counter for weighing objects; motive means for moving the scale relative to the counter; control means for causing a first weighing of an object placed on the scale to take place, then causing the motive means to move the scale incrementally, then causing a second weighing of the object to take place, then comparing the results of the two weighings and causing a signal to be generated if the results of the two weighings are not the same; and means responsive to said signal for informing an operator to resposition the object on the scale if it is not positioned correctly.

In accordance with a third embodiment of the invention, a method for weighing an object placed on a scale comprises the following steps: (a) performing a first weighing of the object by the scale; (b) incrementally moving the scale to change the proportion of total weight of an object on the scale in the event that only part of the object is positioned on the scale; (c) performing a second weighing of the object by the scale; (d) comparing the results of the two weighings; (e) causing a signal to be generated if the results of the two weighings are not the same; and (f) in response to the signal, informing an operator to reposition the object on the scale.

It is accordingly an object of the present invention to provide a system for the accurate weighing of objects which may not be placed properly on a scale.

Another object is to provide a merchandise check-out system including a scale mounted flush with a counter for obtaining the accurate weight of objects which may initially be placed with a portion thereof overhanging the edge of the scale.

Another object is to provide a method for accurately weighing an object placed on a scale.

Another object is to provide a system and method to improve the accuracy of weighing an object on a scale by performing a first weighing, incrementally moving the scale, performing a second weighing, comparing the two results, and providing a signal if the results are not the same.

With these and other objects, which will become apparent from the following description, in view, the invention includes certain novel features of construction and combinations of parts, preferred forms or embodiments of which are hereinafter described with reference to the drawings which accompany and form a part of this specification.

DETAILED DESCRIPTION

Figure 1:
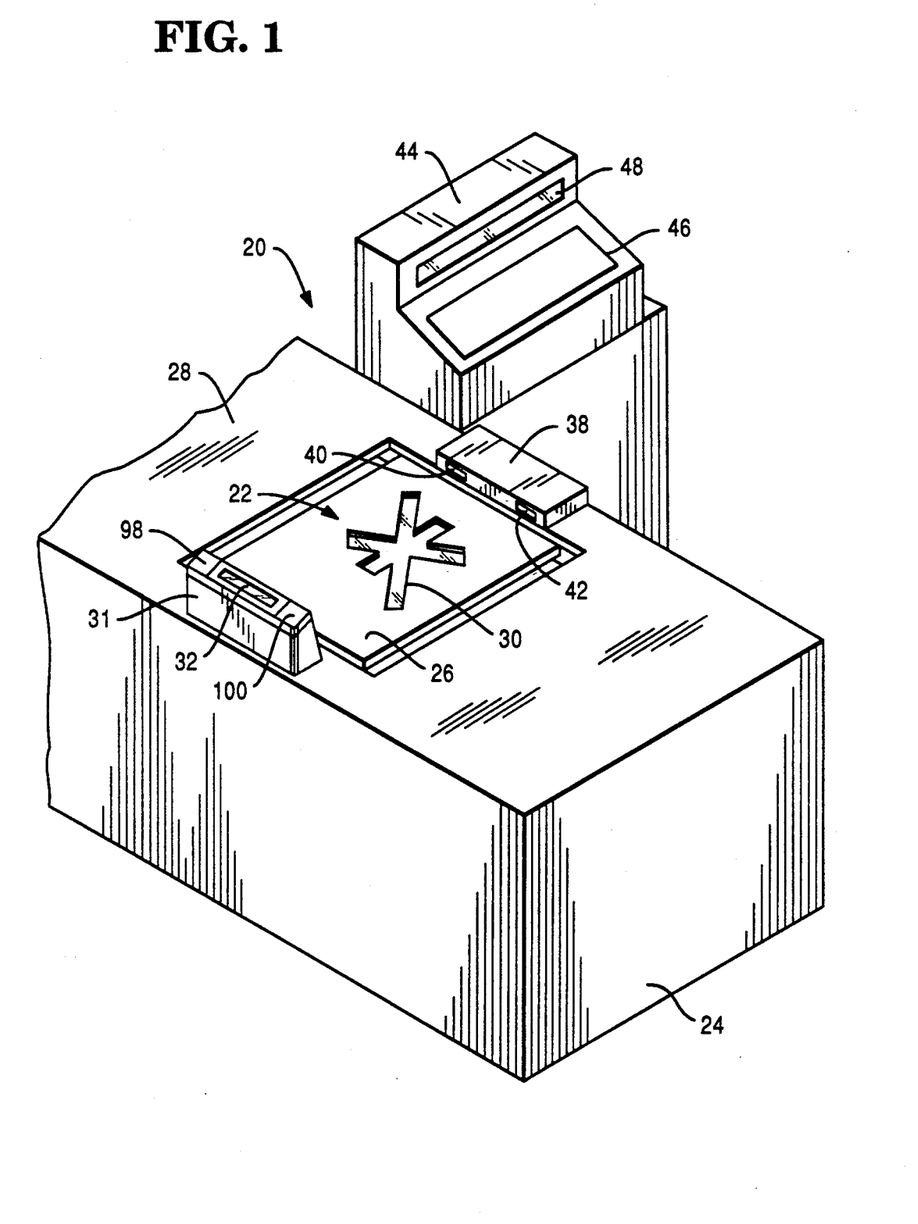
FIG. 1 is a perspective view of a check-out system which includes a scale for weighing purchased items.

Referring now to FIG. 1, there is shown a perspective view of a merchandise check-out system generally indicated by the numeral 20 in which a scale 22 is utilized to weigh a purchased item. The scale is located within a check-out counter 24 and includes a scale lid or load plate 26 movably mounted flush with the top surface 28 of the check-out counter 24. The scale lid 26 includes an aperture 30 through which scanning beams from a scanner assembly 36 (FIG. 2) mounted beneath the scale, are projected for scanning a bar code label (not shown) on a merchandise item positioned on scale lid 26 in a manner that is well known in the art.

Mounted adjacent the scale lid 26 on the surface 28 of the check-out counter 24 is a housing member 31 in which is located a customer display 32 which is an alphanumeric LCD display which displays the price of the merchandise item scanned and also the weight of the item as the result of a weighing operation. Located adjacent to either side of the display 32 within the housing 31 are a pair of signal lights 98 and 100, one red and one green, respectively, which are operated to indicate whether a weighing operation or a scanning operation was successful or not. Opposite the housing 31 on the surface 28 of the counter 24, is a housing 38 in which is located a pair of photo-electric cells 40, 42 which detect the entrance and the exit of the merchandise item on the lid 26. A pair of light emitting diodes (not shown) located in the housing member 31 directs light beams at the cells 40 and 42 in a manner that is well known in the art. Mounted adjacent the check-out counter 24 is a data terminal device 44 for processing the sales transaction which includes a keyboard 46 and a display 48. The display 32 can be operated automatically or by the manual operation of a key on the keyboard 46.

Figure 2:
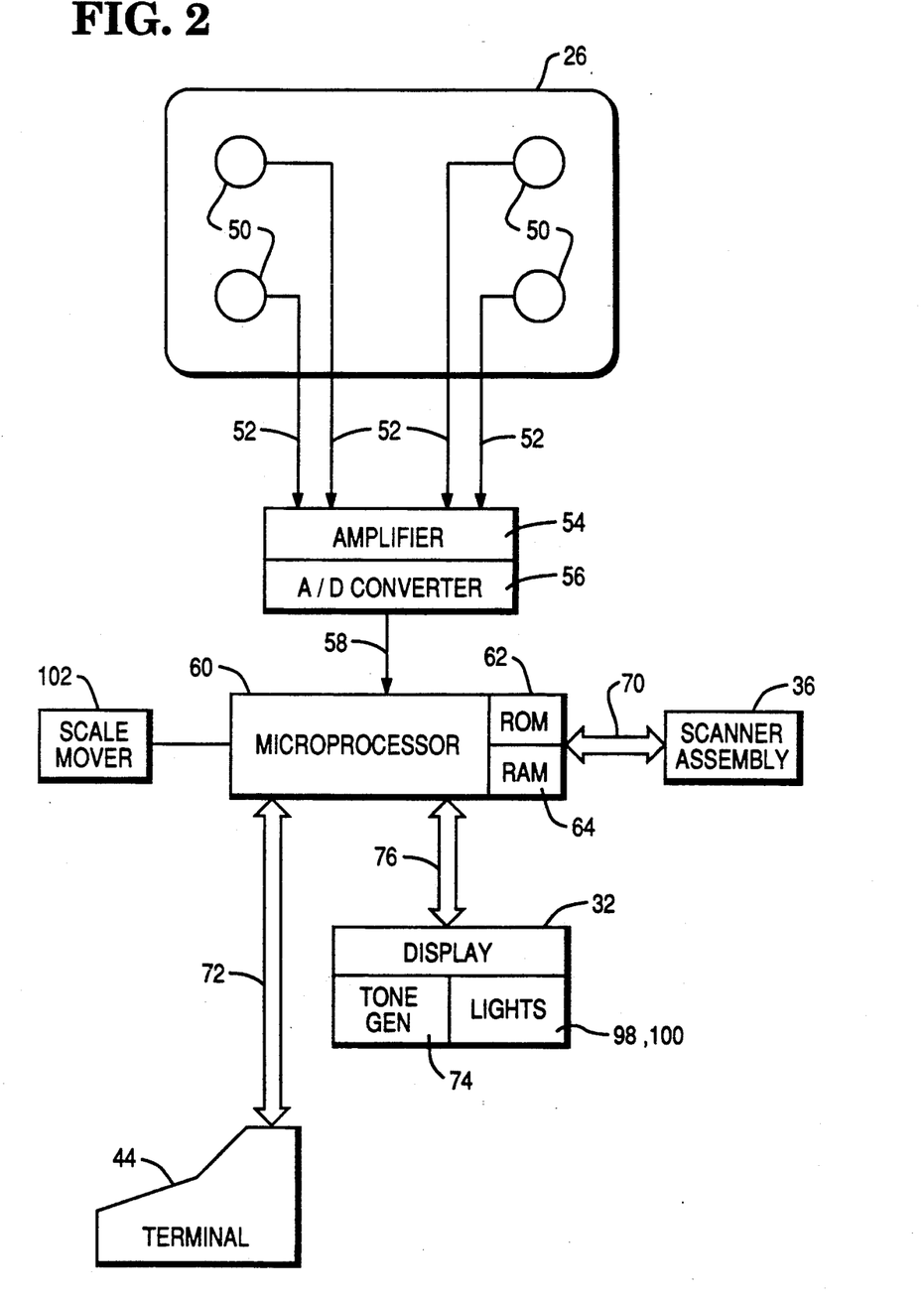
FIG. 2 is a schematic representation of the check-out system of FIG. 1.

Referring now to FIG. 2, there is shown a schematic representation of the check-out system 20 (FIG. 1) in which the scale 22 includes four load cells 50 which are secured to the scale lid 26 and which provide output analog signals over lines 52 to an amplifier 54 in response to the placing of a weighted item on the lid 26. The amplified analog signals are then transmitted to an analog-to-digital converter 56 which outputs digital signals over line 58 to a microprocessor 60 which includes a ROM memory unit 62 and a RAM memory unit 64 in which data is stored. The microprocessor 60 is connected to scale zeroing and calibrating switches (not shown); to the scanner assembly 36 over bus 70; to the terminal 44 over bus 72; and to the display 32, the signal lights 98, 100 and a tone generator 74, over bus 76. The microprocessor 60 monitors the operation of the scanner assembly 36 over cable 70. When the scanner is in operation, the microprocessor 60 controls the display 32 to display the item price or total sale in response to data received from the terminal 44. The microprocessor 60 will also control the display 32 to display the item weight in response to a scale operation. The microprocessor 60 further controls the signal lights 98, 100 and the tone generator 74 in response to the operation of the scanner and the scale indicating a valid or invalid operation.

For a more detailed description of portions of the check-out system which are not directly pertinent to the present invention, reference may be had to U.S. Pat. No. 4,715,457, inventors G. L. Amacher et al., issued Dec. 29, 1987, and assigned to the assignee of the present application, and to patents cited therein.

As is shown in FIG. 2, also coupled to the microprocessor 60 is a scale mover 102, which is used to effect movement of the scale 22, as will subsequently be described in greater detail. The scale mover 102 may be of any suitable type, such as a solenoid or an electric motor, for example.

Figure 3:
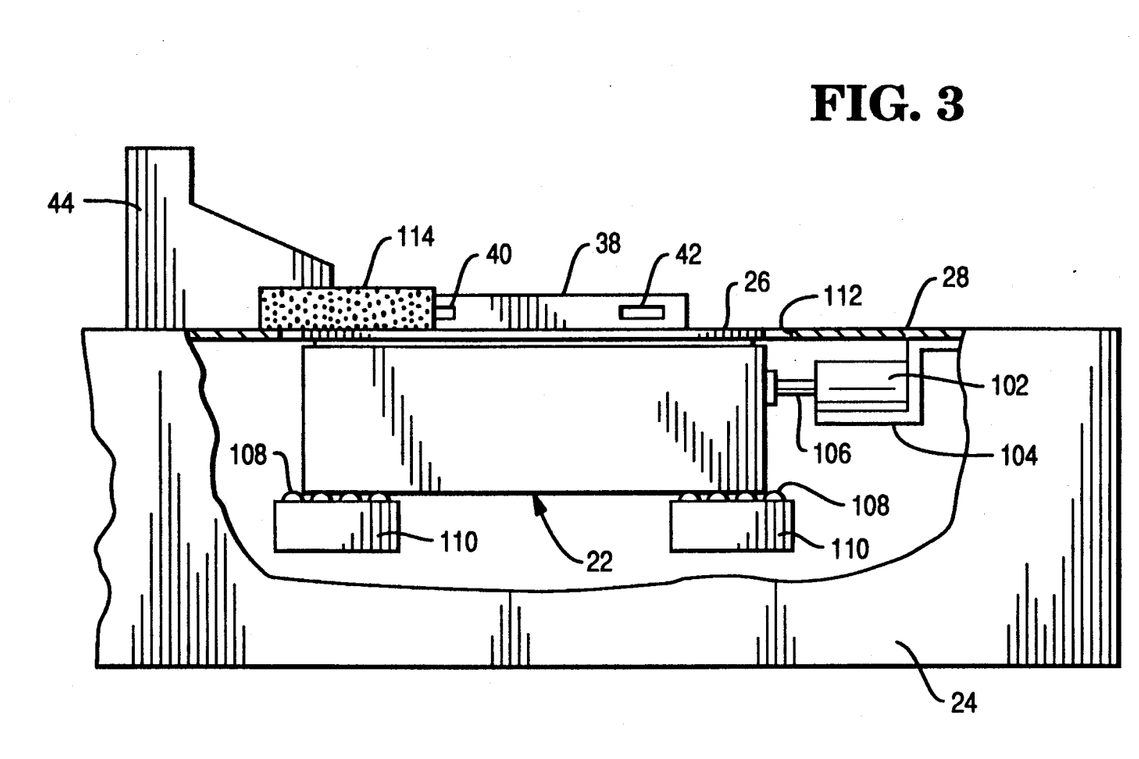
FIG. 3 is a partially broken-away elevation view of the check-out system of FIG. 1, showing the scale mounted and operated for incremental horizontal movement.

As shown in the embodiment of FIG. 3, the scale mover 102 is mounted on a bracket 104 secured to the counter 24, and is coupled to the scale 22 by an element 106 to move it in a horizontal direction, either to the right or the left, as viewed in FIG. 3. The scale 22 is shown in home position on FIG. 3 and is mounted within the counter 24 for sliding movement on bearings 108 which are supported by members 110 attached to the interior of the counter 24. An aperture 112 in the top surface 28 of the counter 24 receives the scale lid 26 of the scale 22. The aperture 112 is sufficiently larger than the scale lid 26 that the desired degree of left-to-right movement of the scale 22 by the scale mover 102 is permitted.

In FIG. 3, an object 114 to be weighed has been placed on the scale lid 26 for weighing. However, it may be seen that it is incorrectly placed, since a portion of the object 114 extends past the edge of the scale lid 26 and rests upon the top surface 28 of the counter 24. It will also be seen that the scale 22 and the lid 26 have been shifted to the left by the scale mover 102. If desired, the scale 22 may normally be positioned in a left position, as viewed in FIG. 4, or in a right position, as viewed in FIG. 5, at the beginning of a weighing operation, or may be centrally located, as shown in FIG. 3. Subsequent movement of the scale for a second weighing operation will cause a different proportion of the object to be weighed to be located on the scale, thus resulting in two different readings, if the object is not located completely on the scale. The object 114 is shown correctly positioned, completely on the lid 26, in FIG. 5.

Figure 5:
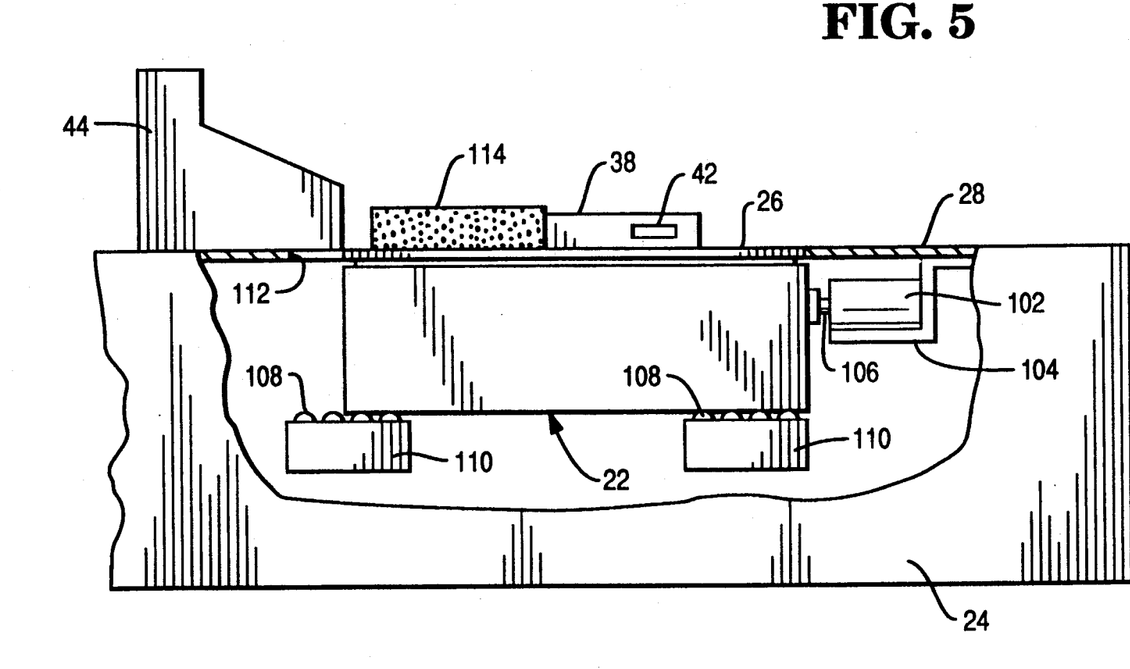
FIG. 5 is a view similar to FIG. 3, in which the scale has been moved to the right.

In FIG. 5, it will be seen that the scale 22 and lid 26 have been moved to the right by the scale mover 102, so that a smaller proportion of the total weight of the object 114 remains on the scale, thus resulting in a lower weight reading. Comparison of the two readings will show that they are different, and therefore that the object 114 has been incorrectly placed on the scale lid 26.

Figure 4:
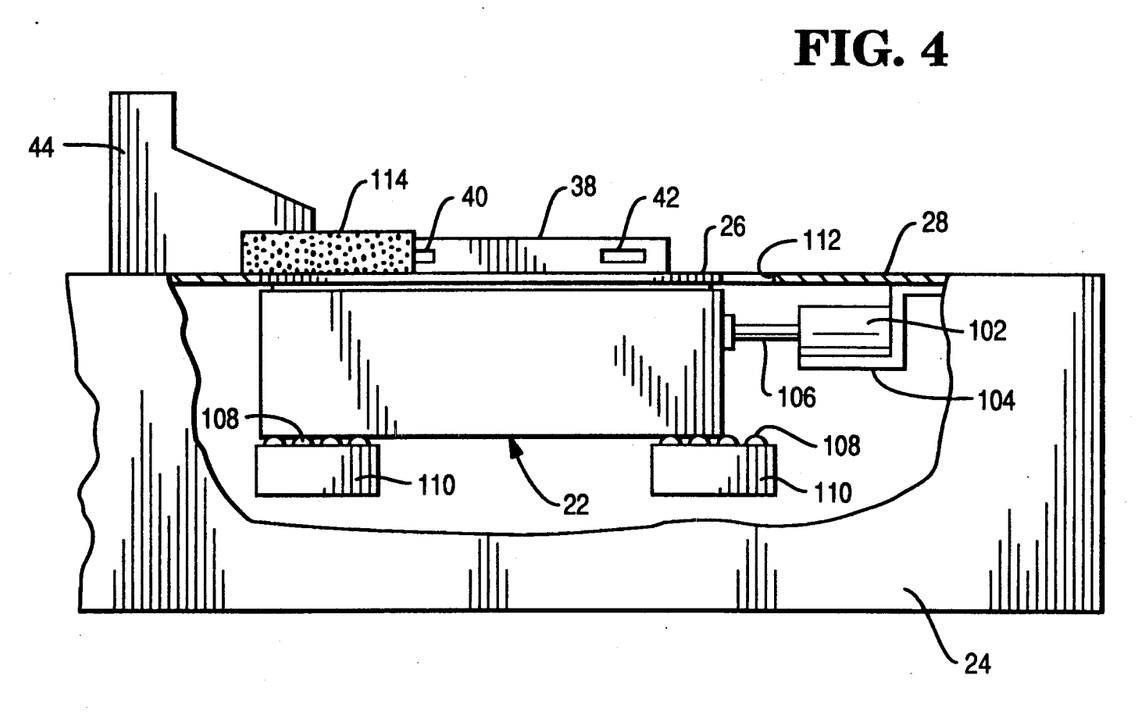
FIG. 4 is a view similar to FIG. 3, in which the scale has been moved to the left.

The actual amount of sideways movement of the scale in the embodiment of FIGS. 3, 4 and 5 can be quite small, for example approximately 0.04 inches, from a normal center position to one side. Normally, movement would be only from the center to one of the two sides. Normal clearance between an edge of the scale lid and a corresponding edge of the counter is approximately 0.18 inches. This clearance is kept as small as possible in order to minimize the possibility of small objects falling through between the scale lid and the counter. Because of the small clearance, the difficulty of properly locating an object on the scale 22 without having it touch the top surface 28 of the surrounding counter 24 is increased.

Figure 6:
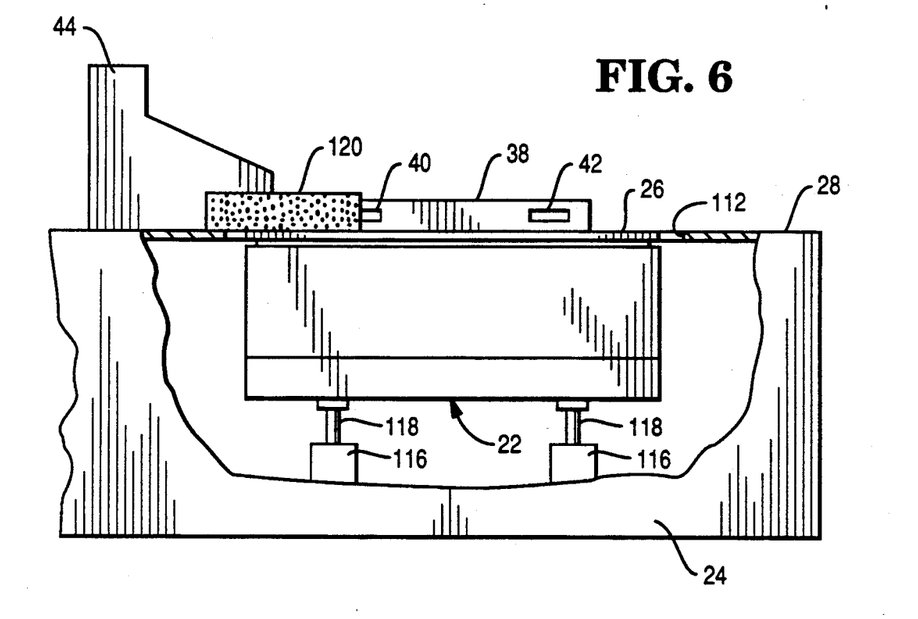
FIG. 6 is a partially broken-away elevation view of the check-out system of FIG. 1, showing an alternative embodiment, in which the scale is mounted and operated for incremental vertical movement.
Figure 7:
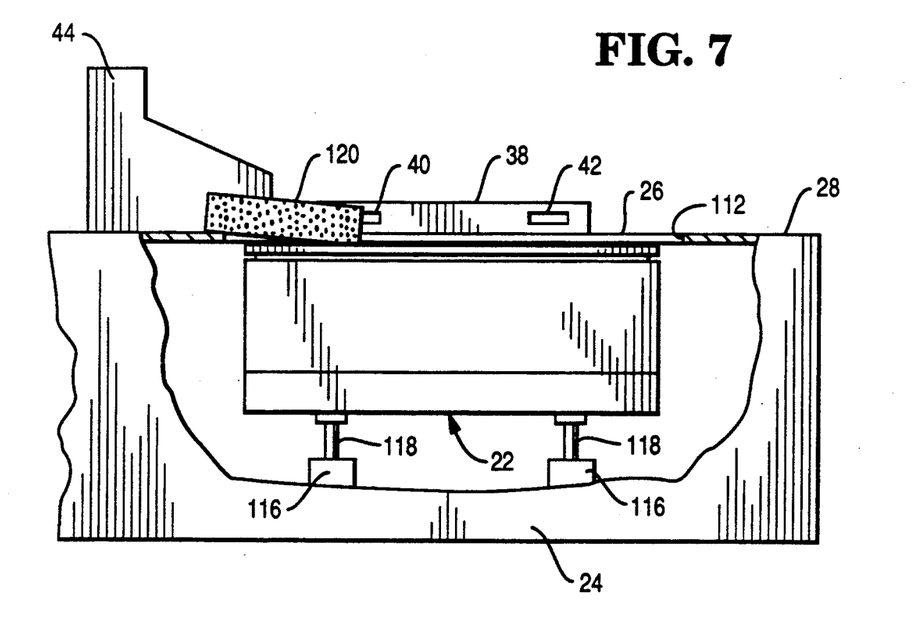
FIG. 7 is a view similar to FIG. 6, in which the scale has been moved downwardly.

FIG. 6 shows a second embodiment of the invention, in which the scale 22 is moved vertically, rather than horizontally. The scale 22 is supported by a pair of scale movers 116 which are connected to the scale 22 by elements 118. In the normal position shown in FIG. 6, the scale 22 is supported at a height such that the scale lid 26 is substantially flush with the top surface 28 of the counter 24. In order to cause a different weighing result for an object 120 which is located partially beyond the edge of the lid 26, the scale 22 may be moved either upwardly or downwardly (as shown in FIG. 7) by the scale movers 116. It will be noted that with this embodiment of the invention, a slightly smaller aperture 112 in the top surface 28 of the counter 24 could be used, if desired, since there is no need to provide space to accommodate horizontal movement of the lid 26 of the scale 22. Normal movement in the vertical direction would be approximately 0.04 inches.

Figure 8:
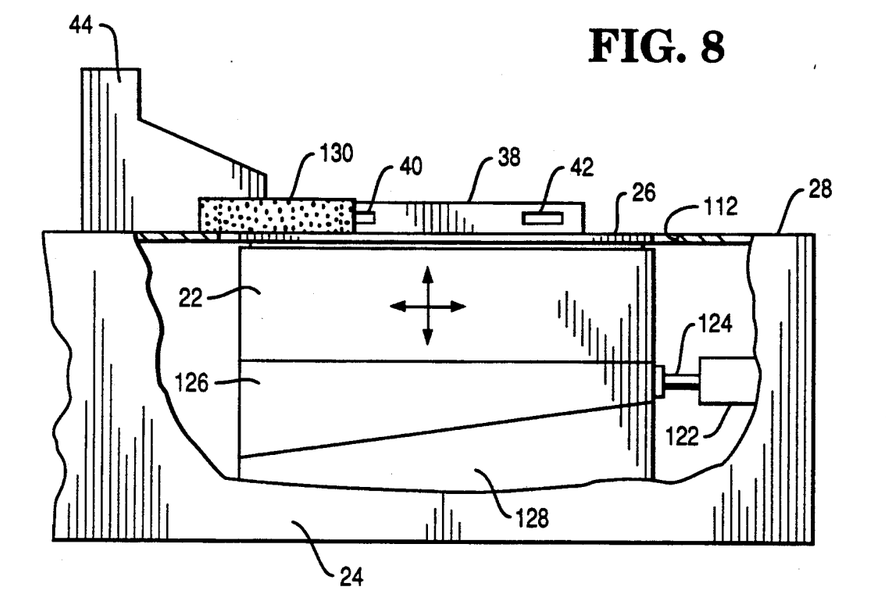
FIG. 8 is a partially broken-away elevation view of the check-out system of FIG. 1, showing another embodiment in which the scale is mounted and operated for incremental movement having both horizontal and vertical movement.
Figure 9:
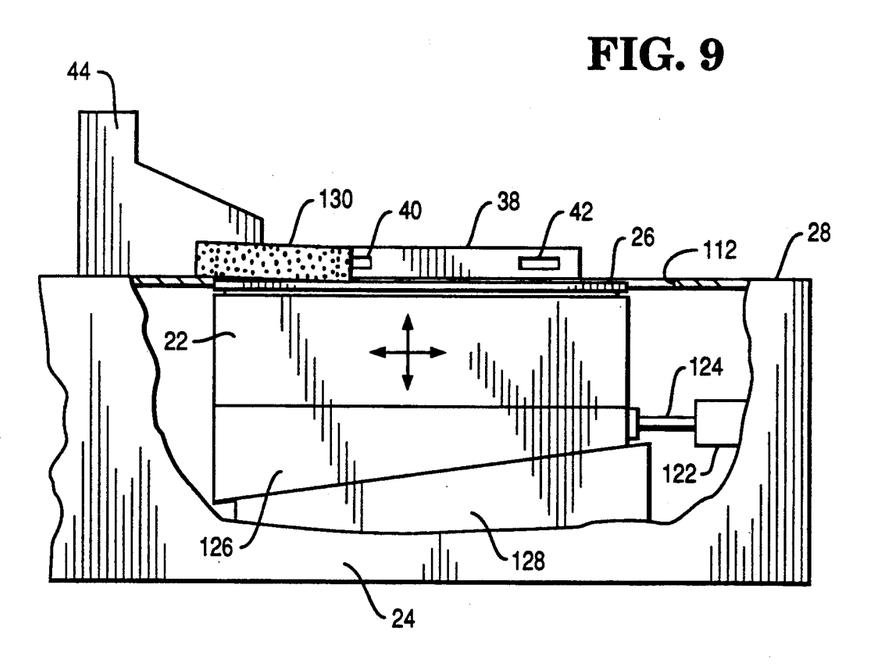
FIG. 9 is a view similar to FIG. 8, in which the scale has been moved incrementally, horizontally and vertically.

FIG. 8 shows a third embodiment of the invention, in which the scale 22 is moved in a direction which has both horizontal and vertical components. The scale 22 is mounted on a first inclined plane member 126 which is mounted for slidable movement on a second inclined plane member 128. The first inclined plane member is coupled to a scale mover 122 by an element 124. Operation of the scale mover 122 causes the first inclined plane member 126, carrying the scale 22 and scale lid 26, to move relative to the second inclined plane member 128, as shown, for example, in FIG. 9. Such a movement causes the scale 22 and scale lid 26 to move in a direction which has both horizontal and vertical components. If an object 130 is placed on the scale lid 26 in such a manner that it extends over the edge of the lid 26, its change in position, which may be noted by a comparison of FIGS. 8 and 9, will cause a different proportion of its total weight to be weighed by the scale 22, so that two different weight readings will result from weighings with the scale 22 in the different positions of FIG. 8 and FIG. 9. It will be seen that the scale mover 122 could move the scale 22 either to the right or to the left, as viewed in FIGS. 8 and 9, thus also producing upward or downward movement of said scale. It will also be seen that other means than the illustrated inclined plane arrangement could be employed to produce the desired multi-dimensional movement. Normal movement of the scale 22 in this embodiment could be approximately 0.04 inches in each of the horizontal and vertical directions.

Figure 10:
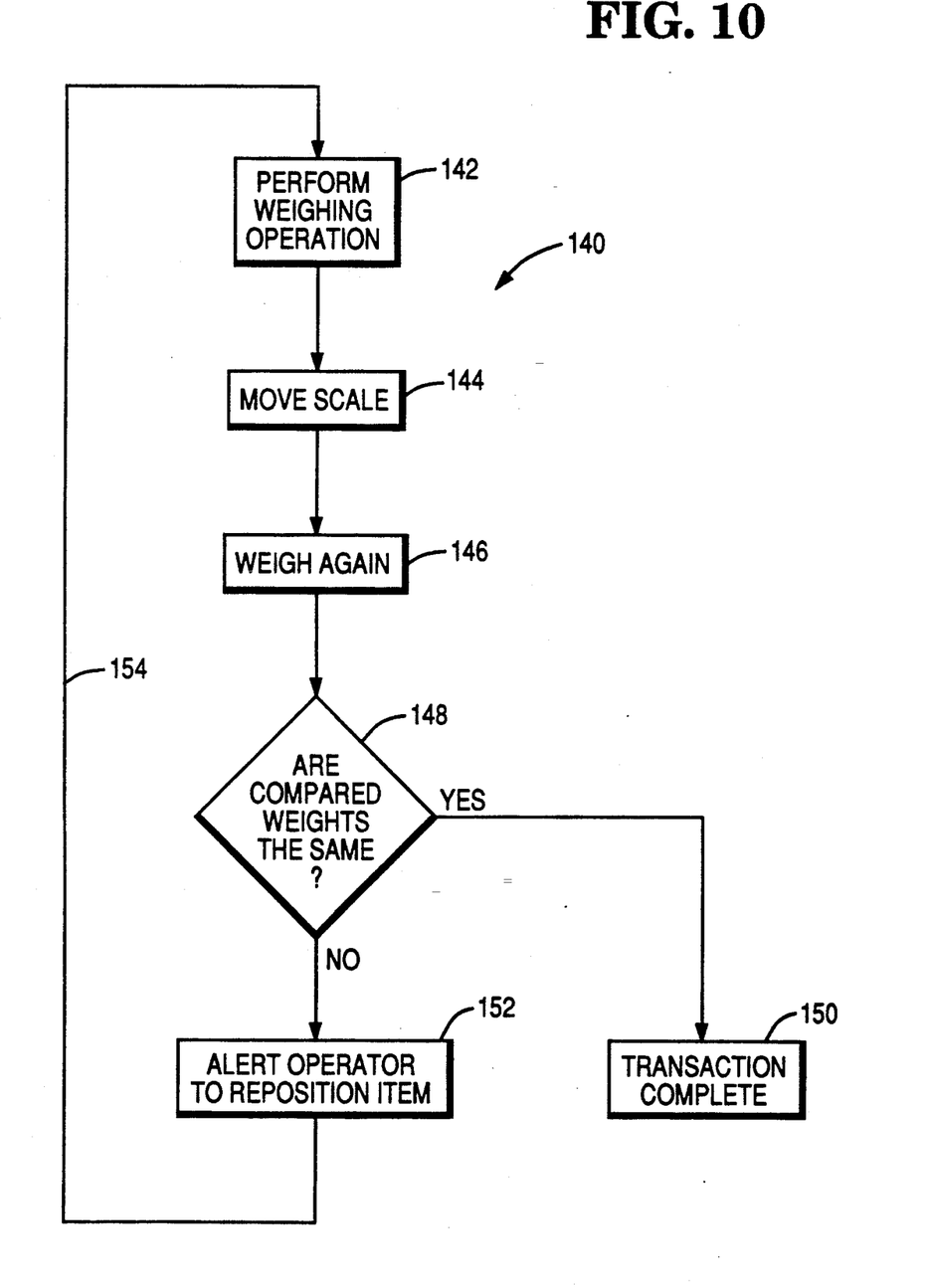
FIG. 10 is a flow diagram illustrating a method for improving the accuracy of weighing an object.

A process 140 in which the systems shown in FIGS. 1-9 are employed to provide a weighing operation having improved accuracy is shown in FIG. 10. The process 140 is commenced by performing an initial weighing operation, as represented by block 142, after which the scale mover causes the scale 22 and associated scale lid 26 to be moved, as represented by block 144. Following this, a second weighing operation is performed, as represented by block 146. The results of the two weighings are compared, as represented by decision block 148. If the results are the same, within a predetermined tolerance, the transaction is considered to be complete, as represented by block 150, and the result of the weighings is displayed on the customer display 32 and transmitted to the terminal device 44, as may be desired in accordance with the predetermined mode of operation of the system. If the two results of the weighings are not the same, within the predetermined tolerance, the operator is alerted by a signal to reposition the item being weighed, as represented by block 152, and the process then returns via path 154 to the block 142. A further weighing operation then takes place. Conversely the system could be arranged so that a signal is generated only if the two weighing results are the same, within a predetermined tolerance or allowance, if desired. The absence of a signal would thus indicate the need for repositioning the object being weighed. The means for alerting the operator to reposition the item (block 152) may employ any appropriate form, such as a flashing light, an audible signal, or a message on the customer display 32, for example.

While the forms of the invention shown and described herein are admirably adapted to fulfill the objects primarily stated, it is to be understood that it is not intended to confine the invention to the forms or embodiments disclosed herein, for it is susceptible of embodiment in various other forms within the scope of the appended claims.

What is claimed is:

1. A system for obtaining the accurate weight of objects which may not be placed properly on a scale, comprising:
   a scale for weighing objects;
   support means for said scale;
   motive means for moving said scale relative to said support means;
   control means for causing a first weighing of an object placed on the scale, causing said motive means to move said scale incrementally, causing a second weighing of said object, comparing the two weighings and generating a signal descriptive of the results of the comparison of the two weighings; and
   means responsive to said signal for informing an operator to reposition the object on the scale if it is not positioned correctly.

2. The system of claim 1 in which the scale is moved in a horizontal direction by the motive means.

3. The system of claim 2, also including bearing means for supporting the scale for horizontal movements.

4. The system of claim 1 in which the scale is moved in a vertical direction by the motive means.

5. The system of claim 1 in which the scale is moved in a direction having both horizontal and vertical components by the motive means.

6. The system of claim 5, also including an inclined plane which is movable by the motive means for imparting movement having both horizontal and vertical movement to the scale.

7. The system of claim 1 in which the motive means is an electric motor.

8. The system of claim 1 in which the motive means is a solenoid.

9. A merchandise check-out system including a scale mounted substantially flush with a counter for obtaining the accurate weight of objects which may initially be placed with a portion thereof overhanging the edge of the scale, comprising:
   a counter having an aperture therein for receiving a scale;

a scale located within the counter for weighing objects;

motive means for moving the scale relative to the counter;

control means for causing a first weighing of an object placed on the scale to take place, then causing the motive means to move the scale incrementally, then causing a second weighing of the object to take place, then comparing the results of the two weighings and causing a signal to be generated if the results of the two weighings are not the same; and means responsive to said signal for informing an operator to reposition the object on the scale if it is not positioned correctly.

10. The system of claim 9 in which the scale is moved in a horizontal direction by the motive means.

11. The system for claim 10, also including bearing means for supporting the scale for horizontal movement.

12. The system of claim 9 in which the scale is moved in a vertical direction by the motive means.

13. The system of claim 9 in which the scale is moved in a direction having both horizontal and vertical components by the motive means.

14. The system of claim 13, also including an inclined plane which is movable by the motive means for imparting movement having both horizontal and vertical movement to the scale.

15. The system of claim 9 in which the motive means is an electric motor.

16. The system of claim 9 in which the motive means is a solenoid.

17. The system of claim 9 in which the scale also includes apparatus for performing a merchandise scanning function.

18. A method for weighing an object placed on a scale comprising the following steps:
    (a) performing a first weighing of the object by the scale;
    (b) incrementally moving the scale to change the proportion of total weight of an object on the scale in the event that only part of the object is positioned on the scale;
    (c) performing a second weighing of the object by the scale;
    (d) comparing the results of the two weighings;
    (e) causing a signal to be generated if the results of the two weighings are not the same; and
    (f) in response to the signal, informing an operator to reposition the object on the scale.

19. The method of claim 18, in which the step of incrementally moving the scale comprises an incremental movement in a horizontal direction.

20. The method of claim 18, in which the step of incrementally moving the scale comprises an incremental movement in a vertical direction.

21. The method of claim 18, in which the step of incrementally moving the scale comprises an incremental movement in a direction having both horizontal and vertical components.

22. The method of claim 21, in which the incremental movement of the scale in a direction having both horizontal and vertical components is accomplished by use of an inclined plane.

23. The method of claim 18, in which the incremental movement of the scale is accomplished by an electric motor.

24. The method of claim 18, in which the incremental movement of the scale is accomplished by a solenoid.

25. The method of claim 18, also including the step of performing a merchandise scanning operation on the object being weighed.

26. The method of claim 18, in which the signal generated in step (e) alerts an operator of the scale to reposition the object being weighed so that it is placed entirely on the scale.

27. The method of claim 26, also including the following additional steps:
    (f) repositioning of the object on the scale by the operator so that the object is entirely located on the scale; and
    (g) weighing the object a third time to obtain a correct weight.

28. The method of claim 18, in which the results of the two weighings are the same, the results are indicated as being the weight of the object.

29. The method of claim 18, in which the weighing operation is part of a merchandise check-out operation.

30. The method of claim 18, in which the signal generated in step (e) is a signal which is audible to the scale operator.

31. The method of claim 18, in which the signal generated in step (e) is a signal which is visible to the operator.

32. The method of claim 18, in which the signal generated in step (e) is a predetermined message which is displayed.

* * * * *